United States Patent
Asai

(10) Patent No.: US 9,046,239 B2
(45) Date of Patent: Jun. 2, 2015

(54) ILLUMINATION DEVICE

(71) Applicant: MINEBEA CO., LTD., Kitasaku-gun, Nagano (JP)

(72) Inventor: Masaki Asai, Fukudi (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 162 days.

(21) Appl. No.: 13/798,502

(22) Filed: Mar. 13, 2013

(65) Prior Publication Data
US 2013/0242568 A1 Sep. 19, 2013

(30) Foreign Application Priority Data

Mar. 15, 2012 (JP) .................................. 2012-058683

(51) Int. Cl.
| | |
|---|---|
| *F21V 3/00* | (2006.01) |
| *F21V 5/02* | (2006.01) |
| *G02B 3/08* | (2006.01) |
| *G02B 19/00* | (2006.01) |
| *F21Y 101/02* | (2006.01) |

(52) U.S. Cl.
CPC ............... *F21V 5/02* (2013.01); *F21Y 2101/02* (2013.01); *G02B 3/08* (2013.01); *G02B 19/0061* (2013.01); *G02B 19/0014* (2013.01)

(58) Field of Classification Search
CPC ... F21Y 2101/02; G02B 19/0061; G02B 3/08
USPC .................. 362/311.02, 333, 339, 249.02
See application file for complete search history.

(56) References Cited

U.S. PATENT DOCUMENTS

| | | | |
|---|---|---|---|
| 8,220,975 B2 * | 7/2012 | Miyashita et al. ............. | 362/340 |
| 8,529,077 B2 * | 9/2013 | Suzuki et al. ................... | 362/84 |
| 8,727,580 B2 * | 5/2014 | Takayama et al. ............. | 362/333 |

FOREIGN PATENT DOCUMENTS

JP   A-2007-220465   8/2007

\* cited by examiner

*Primary Examiner* — Vip Patel
(74) *Attorney, Agent, or Firm* — Oliff PLC

(57) ABSTRACT

An illumination device includes: a light source including a plurality of light emission elements disposed adjacent to one another and phosphors; and a lens sheet including a plurality of first prisms disposed on an optical axis of the light source and disposed concentrically around the optical axis of the light source, wherein a plurality of second prisms reaching up to an outer peripheral portion of the lens sheet is radially formed around the optical axis of the light source on a surface of the lens sheet where the first prisms are formed.

7 Claims, 12 Drawing Sheets

F I G. 1A
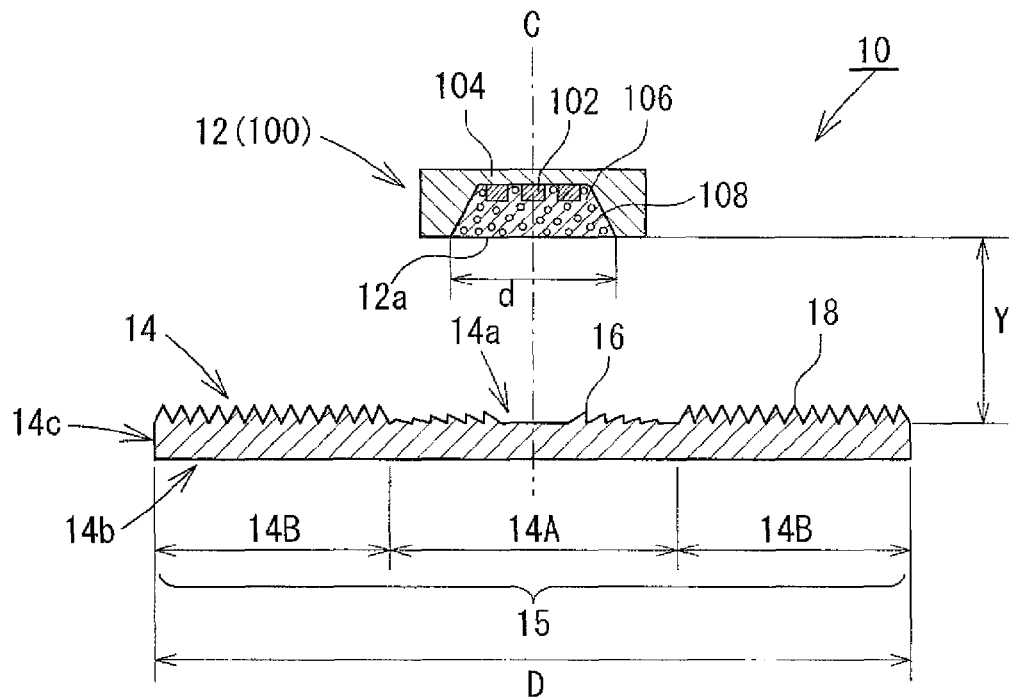
F I G. 1B
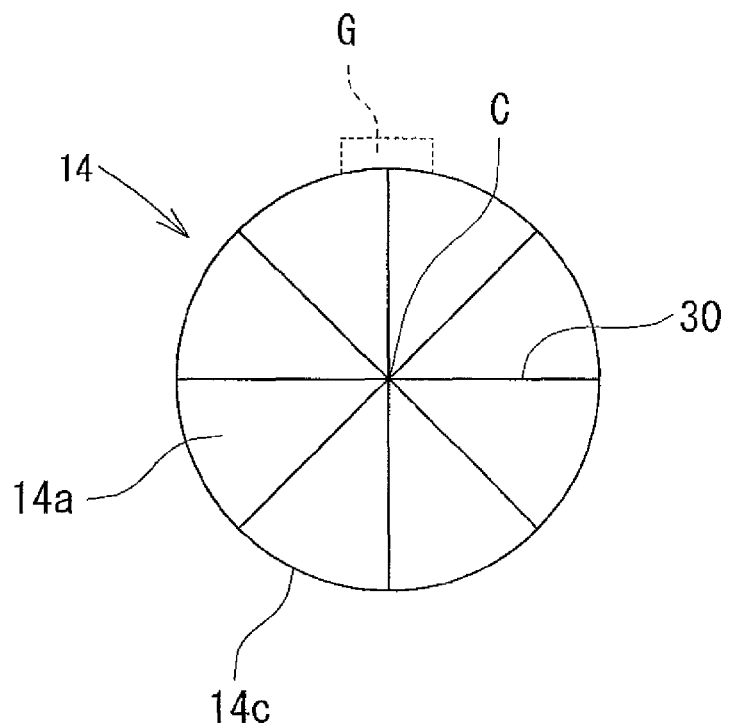

F I G. 2 A
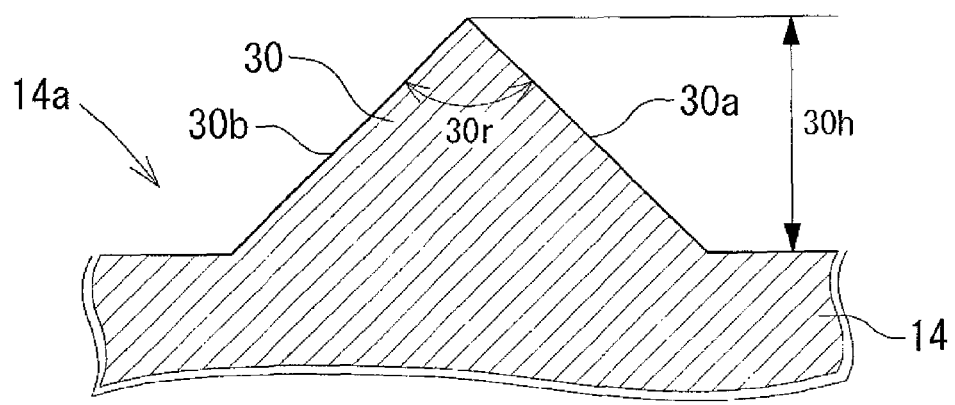
F I G. 2 B
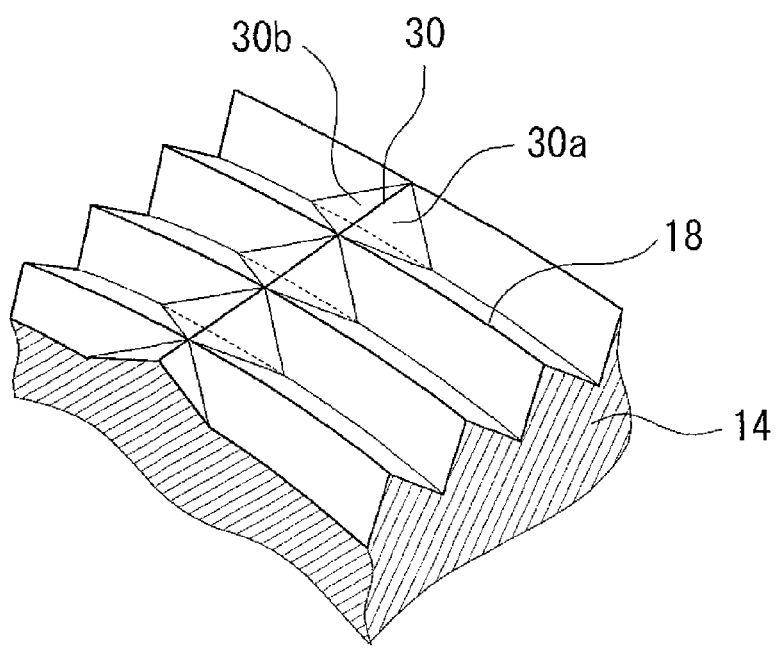

F I G. 3
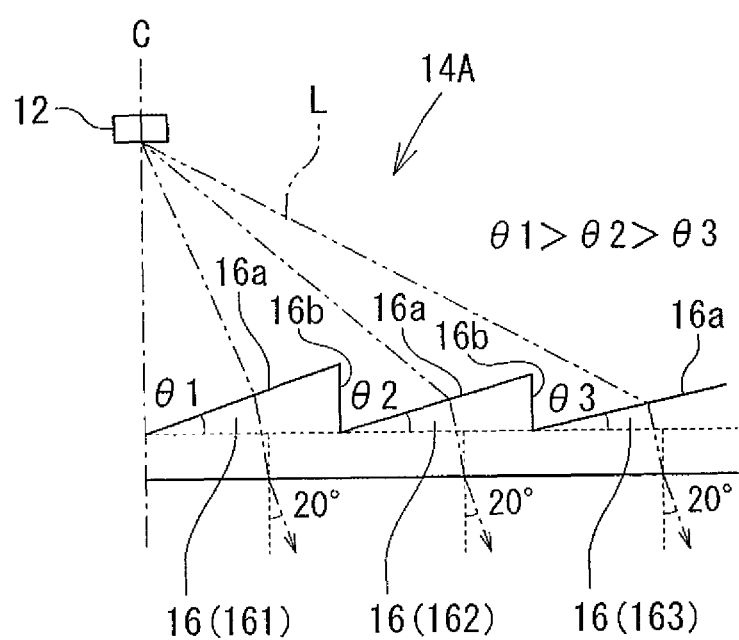

F I G. 6 A
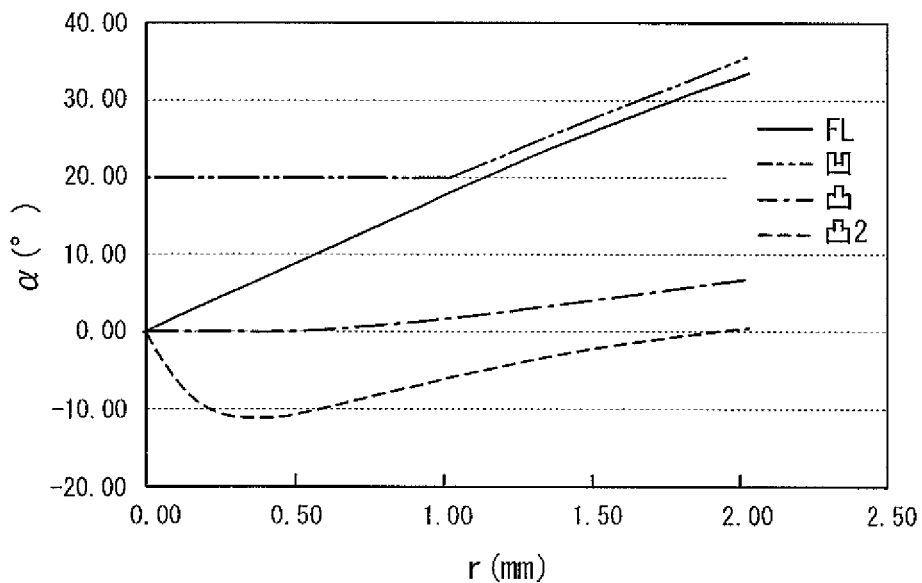
F I G. 6 B
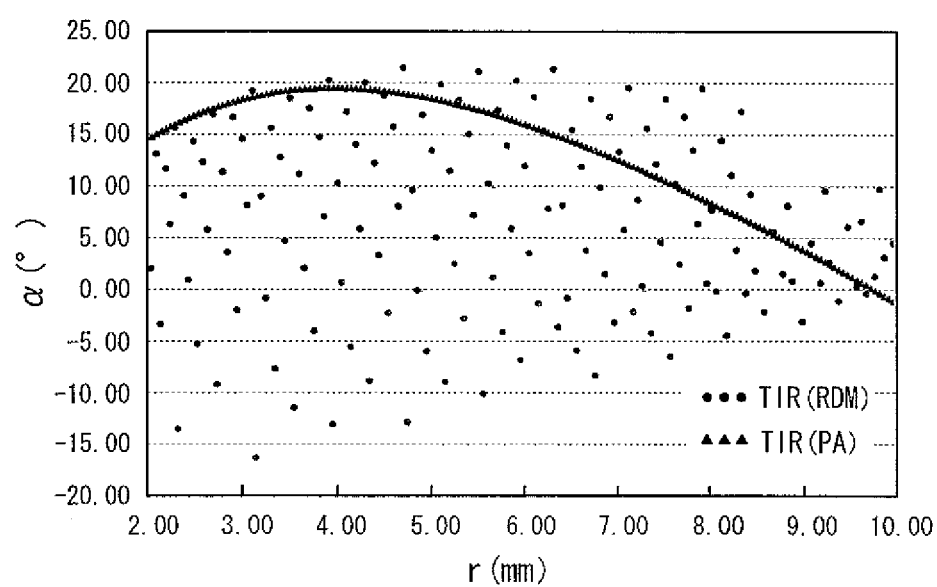

F I G. 8 A
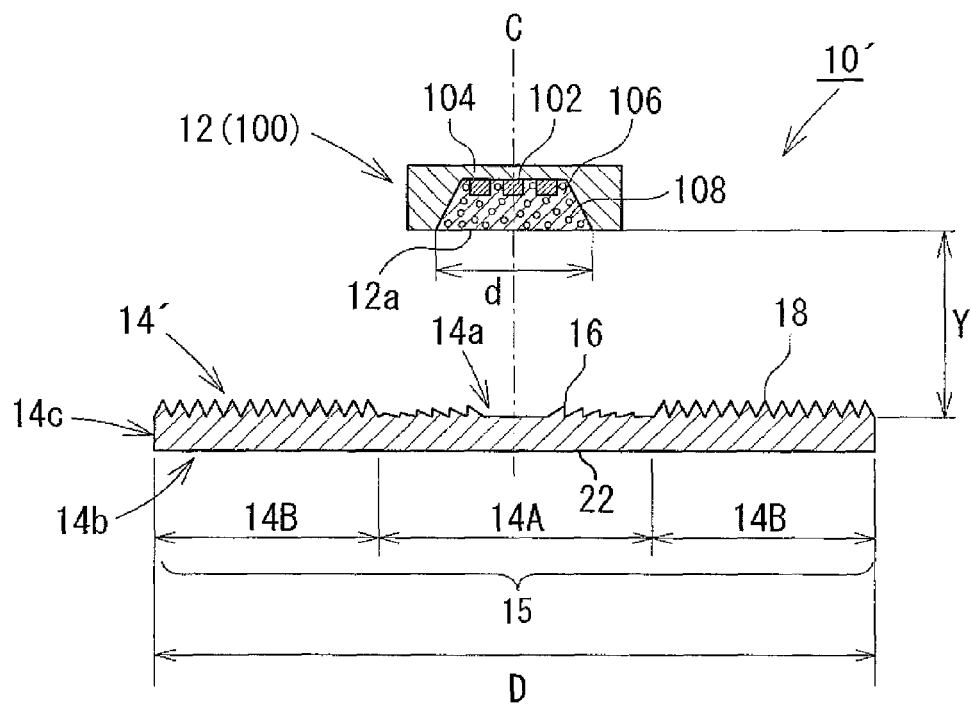
F I G. 8 B
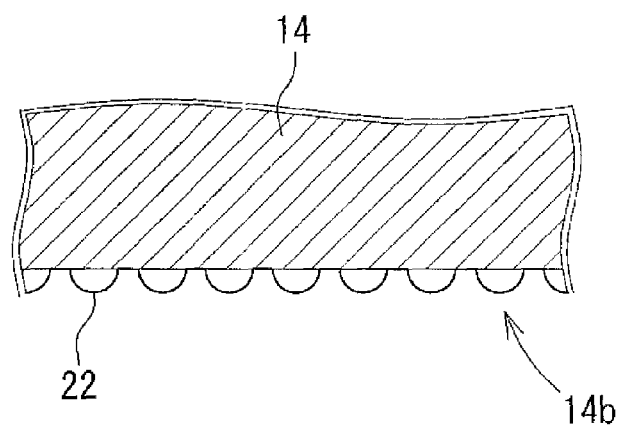

F I G. 9
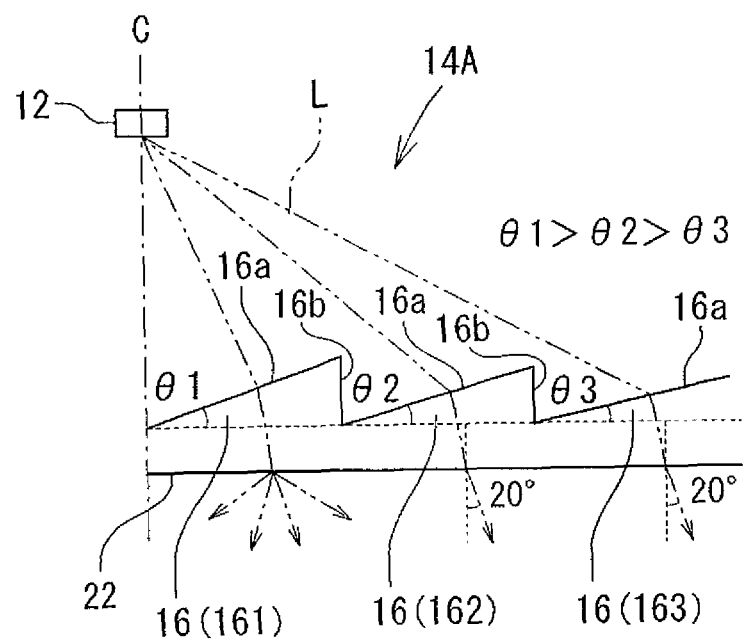

ILLUMINATION DEVICE

BACKGROUND OF THE INVENTION

1. Field of the Invention

The present invention relates to an illumination device including a lens sheet with excellent moldability that can reduce color unevenness without impairing luminance of illumination light.

2. Description of the Related Art

In the past, an incandescent lamp or a fluorescent lamp has been commonly used as a light source for general illumination such as indoor illumination. However, as the performance of today's blue light emitting diode (LED) becomes more advanced, an LED is also used in a light source such as a ceiling light or a downlight (see, for example, JP 2007-220465 A).

FIG. 11 illustrates a so-called pseudo white LED 100, which can be used as a light source of an illumination device. The pseudo white LED 100 includes a lamp house 104, in which a plurality of blue LEDs 102 as light emitting elements is disposed adjacent to one another on a bottom portion thereof, and a transparent resin 106 that seals a concave portion of the lamp house 104. Yellow phosphors 108 such as garnet (YAG) are dispersed in the transparent resin 106. Blue light emitted from the respective blue LEDs 102 is diffused in the transparent resin 106 disposed in the lamp house 104. At this time, the blue light is emitted to the exterior of the lamp house 104 in a state of being wavelength-converted into fluorescent yellow light by the yellow phosphors 108, for convenience, as outgoing light L (L1 and L2) as indicated by a chain double-dashed line. A portion 103 of FIG. 11 is an electrode terminal.

Also, as illustrated in FIG. 12, the outgoing light L from the pseudo white LED 100 is deflected in desired directions by passing through a lens sheet 110 disposed in front of the pseudo white LED 100, which enables a function as the illumination device. In the lens sheet 110 of FIG. 12, a first lens group 112 is disposed on an inner side, when seen from an optical axis C of the pseudo white LED 100 as a reference location, and the first lens group 112 includes refraction prisms. Also, a second lens group 114 is disposed on an outer side of the first lens group 112, and includes reflection (TIR: Total Internal Reflection) prism lenses.

An output angle of the outgoing light L from the pseudo white LED 100 is deflected by both the first lens group 112 and the second lens group 114 to a direction parallel to the optical axis C.

Herein, a case where the lens sheet 110 used in the illumination device described above is formed by an injection molding method will be considered. Generally, in the injection molding method, the lens sheet 110 is formed by injecting a molding material into a molding cavity of a molding die of the lens sheet 110 from a gate G (see FIG. 1B) provided at a location corresponding to an outer peripheral portion of the lens sheet 110. Therefore, in a case where each prism constituting the first lens group 112 or the second lens group 114 of the lens sheet 110, as illustrated in FIG. 12, is formed to have a narrow apex angle and be deep so as to improve the deflection effect, air remains in the vicinity of the apex angle of a groove of the molding cavity provided in the molding die so as to form each prism. Hence, each prism of the lens sheet 110 may not be exactly formed, resulting in degradation in the moldability of the lens sheet 110.

Also, regarding the light emission of the illumination device using the pseudo white LED 100 as the light source as described above, there is the following tendency: when the optical axis C of the pseudo white LED 100 is considered as a center, a central portion is slightly tinged with blue and an outer edge portion is slightly tinged with yellow. The reason is as follows. In FIG. 11, the outgoing light L1 follows an optical path parallel to the optical axis C of the pseudo white LED 100, while the outgoing light L2 follows an optical path inclined with respect to the optical axis C of the pseudo white LED 100. Therefore, the outgoing light L2 passes through the transparent resin 106 in which the yellow phosphors 108 are dispersed for a longer optical path length, and thus a ratio of the wavelength conversion to the fluorescent yellow light due to the yellow phosphors 108 becomes higher, as compared with the outgoing light L1.

Furthermore, in the above illumination device, the pseudo white LED 100 including the plurality of blue LEDs 102 disposed adjacent to one another is used as the light source. In this case, the light emission from the illumination device may cause color unevenness called "chip appearance" on an irradiated surface. This is a visible phenomenon caused by a series of light with high blue chromaticity and high luminance in the outgoing light from the respective blue LEDs 102 on the irradiated surface.

Such color unevenness of the illumination light causes deterioration of quality. This is not a matter in the case of the conventional illumination device using an incandescent lamp or a fluorescent lamp but peculiar to the illumination device using the pseudo white LED 100 as the light source.

SUMMARY OF THE INVENTION

The present invention has been made in view of the problems described above, and an object of the invention is to reduce color unevenness without impairing luminance of illumination light of an illumination device by using a lens sheet with excellent moldability.

Aspects of the present invention described hereinafter are just examples of a configuration of the present invention, and each of the aspects will be described separately for facilitating understanding of a variety of configurations of the present invention. Each aspect does not limit the technical scope of the present invention. While considering the best mode for carrying out the invention, each aspect may be modified by replacing or deleting a part of components of each aspect or adding another component, and such modification may also fall within the technical scope of the present invention.

According to a first aspect of the invention, there is provided an illumination device including: a light source including a plurality of light emission elements disposed adjacent to one another and phosphors; and a lens sheet disposed on an optical axis of the light source where the lens sheet includes a plurality of first prisms disposed concentrically around the optical axis of the light source, wherein a plurality of second prisms reaching up to an outer peripheral portion of the lens sheet is radially formed around the optical axis of the light source on a surface of the lens sheet where the first prisms are formed.

With this structure, the illumination device has the light source including the plurality of light emitting elements disposed adjacent to one another; and the phosphors receiving light emitted by the light emitting elements and emitting the wavelength-converted light. The lens sheet is disposed on the optical axis of the light source. The lens sheet includes the plurality of first prisms disposed concentrically around the optical axis of the light source. Furthermore, the plurality of second prisms reaching up to the outer peripheral portion of the lens sheet is radially formed around the optical axis of the light source on the surface where the first prisms of the lens sheet are formed. Therefore, each first prism and each second prism intersect with each other at the plurality of locations.

Here, a case where the lens sheet of the illumination device is formed by the injection molding method will be described. The lens sheet is formed by injecting the molding material into the molding die of the lens sheet from the location corresponding to the outer peripheral portion of the lens sheet through the gate of the injection molding machine, and filling the cavity of the molding die with the molding material. The grooves for forming the first prisms are concentrically provided in the molding die of the lens sheet. Moreover, the grooves for forming the second prisms are provided to intersect with the plurality of grooves for forming the first prisms at the plurality of locations and to reach up to the region corresponding to the outer peripheral portion of the lens sheet. Therefore, when filling the cavity of the molding die with the molding material, air existing in the cavity is efficiently discharged to the exterior of the molding die from the region corresponding to the outer peripheral portion of the lens sheet of the molding die through the grooves for forming the second prisms, which intersect with the grooves for forming the first prisms, without remaining in the vicinity of the apex angles of the grooves for forming the first prisms (at which air tends to easily remain). Therefore, in the illumination device according to the first aspect, when the lens sheet is formed by the injection molding method, the shape of the lens sheet is not deformed by air remaining in the cavity of the molding die, and the lens sheet has a desired shape with excellent moldability.

With this structure, the outgoing light from the light source is input to the lens sheet disposed on the optical axis of the light source. The optical path of the light input to the lens sheet is deflected by the plurality of first prisms disposed concentrically around the optical axis of the light source on the lens sheet, and the light whose optical path is deflected by the plurality of first prisms is output. Furthermore, the plurality of second prisms reaching up to the outer peripheral portion of the lens sheet is radially formed around the optical axis of the light source on the surface where the first prisms of the lens sheet are formed. Thus, the light output through the second prisms receives a deflection effect different from that of the light output through the first prisms and is output from the lens sheet. In this manner, the use of the lens sheet with excellent moldability facilitates the color mixture of the outgoing light from the light source that is output through the lens sheet. Therefore, color unevenness of the illumination device is reduced.

Moreover, the plurality of second prisms having the configuration described above is formed on the lens sheet. Thus, the strength of the lens sheet is enhanced as compared with a case where the second prisms are not formed. As a result, the impact resistance of the illumination device is enhanced, and the damage of the illumination device is prevented when the device is dropped down. Here, as the strength of the lens sheet is increased, the lens sheet can be made further thin. Therefore, the light output from the lens sheet, the weight reduction of the illumination device, and the cost reduction of materials can be extended.

According to the first aspect of the invention, the second prisms each have an inclined surface that is inclined with respect to a surface of an opposite side of the lens sheet.

In the illumination device, each of the plurality of second prisms, which is formed on the lens sheet, has the inclined surfaces that are inclined with respect to the opposite surface of the lens sheet. In this manner, the outgoing light from the light source that is input to the second prism of the lens sheet more effectively receives the deflection effect on the inclined surfaces of the second prism, and is output from the lens sheet. Also, the inclined surfaces may be curved surfaces, and the longitudinal sectional shape of the second prism may be a circular arc shape. In this case, the outgoing light from the light source that is input to the second prism also more effectively receives the deflection effect on the curved surfaces of the second prism, and is output from the lens sheet. Therefore, the color mixture with the outgoing light output through the first prism of the lens sheet is further facilitated.

According to the first aspect of the invention, all of the second prisms each intersect near the optical axis of the light source.

In the illumination device, the plurality of second prisms formed to reach up to the outer peripheral portion of the lens sheet is radially disposed around the optical axis of the light source on the lens sheet, and the plurality of second prisms is all formed to intersect with one another near the optical axis of the light source. That is, all of the second prisms are formed from the optical axis of the light source to the outer peripheral portion of the lens sheet. In this manner, the outgoing light from the light source that is input to the lens sheet also receives the deflection effect of the second prism near the optical axis of the light source. Thus, the outgoing light, whose optical path is deflected, is output. Moreover, all of the second prisms are formed to intersect with one another near the optical axis of the light source. Thus, the outgoing light from the light source that is input to the lens sheet near the optical axis of the light source is deflected in different directions at each second prism, and is output from the lens sheet. Therefore, at the locations near the optical axis of the light source, at which color unevenness easily occurs, the color mixture of the outgoing light output through different second prisms of the lens sheet is facilitated. Furthermore, the color mixture with the outgoing light output through the first prisms is also facilitated.

According to the first aspect of the invention, each of the second prisms is formed such that a cross-sectional area of the second prism increases as moving closer to the optical axis of the light source.

In the illumination device, the plurality of second prisms provided radially around the optical axis of the light source in the lens sheet is respectively formed such that the longitudinal sectional area thereof increases as the second prism becomes closer to the optical axis of the light source. In this manner, as the second prism becomes closer to the optical axis of the light source, the deflection effect by the second prism is increased. Since the deflection effect of the second prism with respect to the outgoing light from the light source is controlled as appropriate according to the distance from the vicinity of the optical axis of the light source at which color unevenness easily occurs, the color mixture between the outgoing light output through the second prism and the outgoing light output through the first prism is facilitated as appropriate.

According to the first aspect of the invention, the plurality of first prisms includes a first lens group disposed on an inner side and a second lens group disposed on an outer side of the first lens group when setting the optical axis of the light source to be a reference location, and the first lens group includes a plurality of prisms each having an inclined surface that is inclined toward the optical axis of the light source.

In the illumination device, the plurality of first prisms formed on the lens sheet includes the first lens group and the second lens group, wherein when the optical axis of the light source is considered as the reference location, the first lens group is disposed on the inner side and the second lens group is disposed on the outer side of the first lens group. The first lens group includes the plurality of prisms each having the inclined surface that is inclined toward the optical axis of the light source. Therefore, when the outgoing light from the light source is output from the lens sheet, the optical path of the outgoing light is deflected outward with respect to the optical axis of the light source by the plurality of prisms included in the first lens group. When controlling the deflection direction of the outgoing light, the increase in the height of the prism in order to change the inclination angle of the inclined surface according to the distance from the optical axis of the light source results in the increase in the area of the surface of the prism parallel to the optical axis. However, since the inclined surfaces of the first lens group are inclined toward the optical axis of the light source, the outgoing light from the light source is not directly input to the surface of the prism parallel to the optical axis, and deterioration in light use efficiency is not caused. Also, the color mixture is facilitated between the outgoing light from the light source that is output through the first lens group of the lens sheet and the outgoing light from the light source that is output through the second lens group disposed on the outer side of the first lens group. Furthermore, the color mixture with the outgoing light from the light source that is output through the second prism is also facilitated.

According to the first aspect of the invention, the plurality of prisms included in the first lens group is formed such that an inclination angle of the inclined surface decreases according to a distance from the optical axis of the light source.

In the illumination device, the plurality of prisms included in the first lens group constituting the first prism is configured such that the inclination angles of the inclined surfaces decrease according to the distance from the optical axis of the light source. Thus, the control of the deflection direction according to the distance from the optical axis of the light source is performed by the plurality of prisms included in the first lens group. For example, the inclination angle of the inclined surface of each prism decreases according to the distance from the optical axis of the light source such that the output angle of the outgoing light from the light source, which is output through the first lens group of the lens sheet, becomes constant regardless of the distance from the optical axis of the light source.

According to the first aspect of the invention, the plurality of first prisms and the plurality of second prisms are formed on a surface of the lens sheet that faces the light source, and a plurality of light scattering elements is formed on a surface opposite to the surface of the lens sheet that faces the light source.

In the illumination device, a plurality of first prisms and a plurality of second prisms are formed on the surface of the lens sheet that faces the light source, and a plurality of light scattering elements is formed on the surface opposite to the surface of the lens sheet that faces the light source. In this manner, the outgoing light from the light source that is input to the lens sheet receives the deflection effect by the plurality of first prisms and the plurality of second prisms formed the surface of the lens sheet that faces the light source, and the optical path of the outgoing light is deflected. Moreover, the light whose optical path is deflected travels within the lens sheet and is then scattered into various angles by the plurality of light scattering elements provided on the surface opposite to the surface of the lens sheet that faces the light source. Thus, directional characteristic of the light is deteriorated and the light is output from the lens sheet. Therefore, the color mixture of the outgoing light from the light source that is output through the lens sheet is further facilitated, and the color unevenness of the illumination device is further reduced.

According to the aspects of the present invention, the use of the lens sheet with excellent moldability can make it possible to reduce the color unevenness without impairing the luminance of the illumination light of the illumination device.

BRIEF DESCRIPTION OF DRAWINGS

FIG. 1A is a cross-sectional view schematically illustrating a configuration of an illumination device according to a first embodiment of the present invention, and FIG. 1B is a schematic diagram illustrating a lens sheet illustrated in FIG. 1A, when seen from a light source side;

FIGS. 2A and 2B illustrate a second prism formed on the lens sheet of the illumination device illustrated in FIGS. 1A and 1B, wherein FIG. 2A is a cross-sectional view schematically illustrating the shape of the second prism, and FIG. 2B is a partial perspective view of the lens sheet;

FIG. 3 illustrates a half of a first lens group disposed on one side of an optical axis of a light source in the lens sheet of the illumination device illustrated in FIGS. 1A and 1B, wherein the first lens group constitutes a first prism and is disposed on an inner side when the optical axis of the light source is considered as a reference location;

FIG. 6A is a view partially extracted from the graph of FIG. 5, illustrating a range according to the light source which is output through the first lens group constituting the first prism of the lens sheet, in FIG. 5, and FIG. 6B is a view partially extracted from the graph of FIG. 5, illustrating a range according to the light source which is output through a second lens group of the lens sheet;

FIG. 8A is a cross-sectional view schematically illustrating a configuration of an illumination device according to a second embodiment of the present invention, and FIG. 8B is a magnified cross-sectional view of a part of a region of an opposite surface to a light source in a lens sheet illustrated in FIG. 8A, wherein the region is adjacent to an optical axis of the light source and light scattering elements are formed in the region;

FIG. 9 illustrates a half of a first lens group disposed on one side of an optical axis of a light source in the lens sheet of the illumination device illustrated in FIGS. 8A and 8B, wherein the first lens group constitutes a first prism and is disposed on an inner side when the optical axis of the light source is considered as a reference location;

DETAILED DESCRIPTION OF THE PREFERRED EMBODIMENTS

Figure 4A:
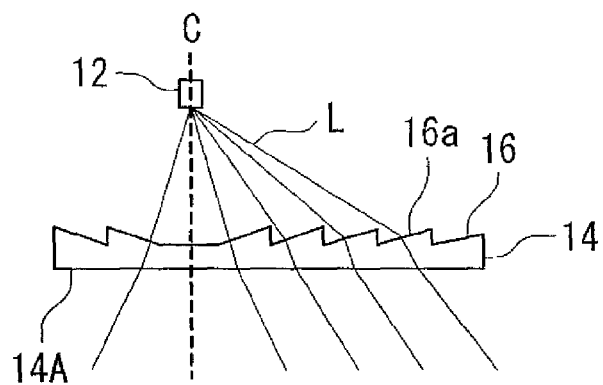
FIG. 4A is a cross-sectional view illustrating an optical path of outgoing light from a light source which is output through the first lens group constituting the first prism in the lens sheet of the illumination device illustrated in FIGS. 1A and 1B, and FIGS. 4B, 4C and 4D are cross-sectional views respectively illustrating optical paths according to comparative examples.

Hereinafter, embodiments of the present invention will be described with reference to the drawings. Herein, the same reference numerals are assigned to the same or equivalent portions as those of the prior art, and detailed description thereof will not be repeated.

Figure 11:
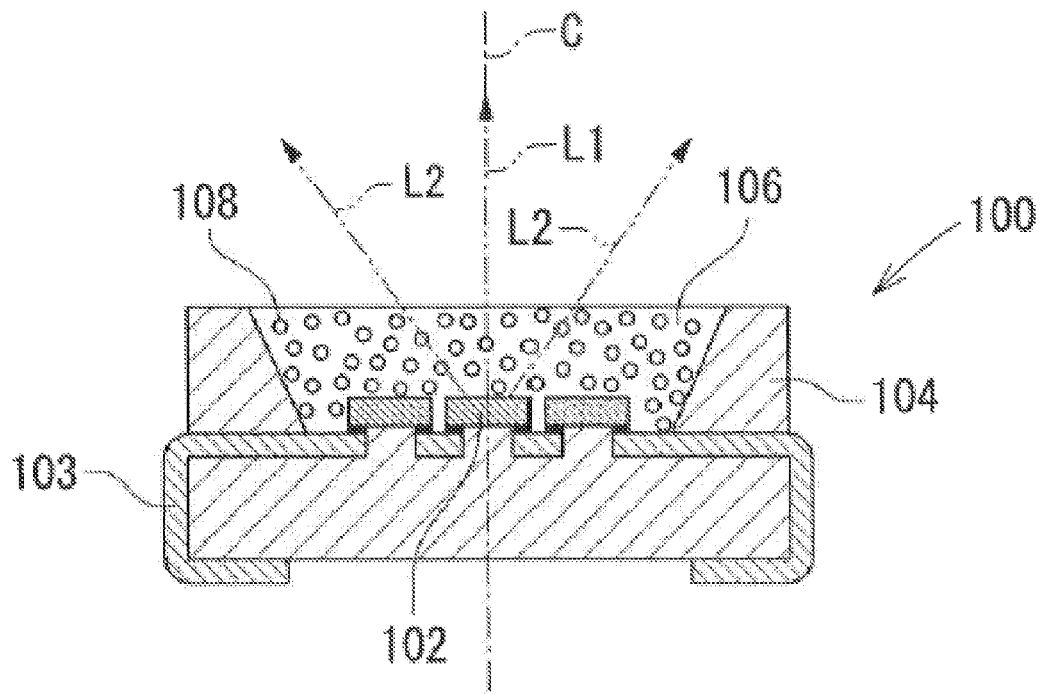
FIG. 11 is a cross-sectional view illustrating a pseudo white LED and outgoing light thereof.

As illustrated in FIG. 1A, an illumination device 10 according to a first embodiment of the present invention includes a light source 12 and a lens sheet 14. The lens sheet 14 includes a plurality of first prisms 15 disposed symmetrically with respect to an optical axis C of the light source 12. The light source 12 has a configuration of a pseudo white LED 100 similar to the one illustrated in FIG. 11, and the same reference numerals are assigned to the same components as described in those in FIG. 11. Also, in the example of FIG. 1A, the light source 12 is exemplified by the pseudo white LED in which three blue light emitting diodes 102 are disposed. However, in the light source 12 of the illumination device 10 according to the present embodiment, the number of blue light emitting diodes 102 is set to three to several dozens, and arrangement pitch thereof is set to about 0.25 mm.

The lens sheet 14 is disposed in front (in a light output direction) of a light emission surface 12a of the light source 12. In the example of FIG. 1A, the first prism 15 described above is formed on a surface 14a of the lens sheet 14 which faces the light source 12. The first prism 15 includes a first lens group 14A and a second lens group 14B, wherein when an optical axis C of the light source 12 is considered as a reference location, the first lens group 14A is disposed on an inner side and the second lens group 14B is disposed on an outer side of the first lens group 14A. Also, the lens sheet 14 is formed to have a disk shape whose center is at the optical axis C of the light source 12.

Also, as schematically illustrated in FIG. 1B, a plurality of second prisms 30 is radially formed around the optical axis C of the light source 12 on the surface 14a of the lens sheet 14 which faces the light source 12. The second prisms 30 are formed, from the optical axis C of the light source 12, with a length reaching an outer peripheral portion 14c of the lens sheet 14. Therefore, all the second prisms 30 intersect near the optical axis C of the light source 12. Also, in the example of FIG. 1B, eight second prisms 30 extending from the optical axis C of the light source 12 to the outer peripheral portion 14c of the lens sheet 14 are formed, but a larger or smaller number of the second prisms 30 may be formed in the lens sheet 14 of the illumination device 10 according to the present embodiment. Also, in FIG. 1B, a location of a dashed line indicated by reference symbol G represents a location of a gate at which a molding material is injected when the lens sheet 14 is formed by an injection molding method. Also, in order to facilitate the understanding of the first prism 15 and the second prism 30 formed in the lens sheet 14, the illustration of the second prism 30 is omitted in FIG. 1A, and the illustration of the first prism 15 is omitted in FIG. 1B.

Furthermore, the illumination device 10 is configured by providing a bowl-shaped reflector (not illustrated) or a cylindrical reflector (not illustrated) with a bottom, which integrally covers the light source 12 and the outer edge portion of the lens sheet 14.

Also, in the first embodiment of the present invention, a distance Y between a light emission surface 12a of the light source 12 and the surface 14a of the lens sheet 14 which faces the light source 12 is set to be substantially consistent with a diameter d of the light emission surface 12a of the light source 12. However, the distance Y may be set in a range of 0.5 d≤Y≤1.5 d from the viewpoint of reducing color unevenness, without impairing the luminance of illumination light of the illumination device 10, and promoting the downsizing of the illumination device 10. Also, from the same viewpoint, a diameter D of the lens sheet 14 may be set to $TAN^{-1}$ (D/2Y) <80°. If taking the size of the lens sheet 14 as an example, a diameter D is about 70 mm and a thickness (vertical length in FIG. 1A) is about 1 mm.

Next, the second prism 30 formed in the lens sheet 14 will be described in detail with reference to FIG. 2. FIG. 2A schematically illustrates a longitudinal sectional shape of the second prism 30. The longitudinal sectional shape of the second prism 30 is a triangular shape in which a height is 30h and an apex angle is 30r. Therefore, the second prism 30 has two inclined surfaces 30a and 30b which are inclined toward a surface 14b of an opposite side of the lens sheet 14 with respect to the light source 12 (see FIG. 1A). Also, although the values of the apex angle 30r and the height 30h are arbitrary, the apex angle 30r and the height 30h are, for example, about 90° and about 70 μm, respectively. Also, although the second prism 30 in the example of FIG. 2A has the triangular shape in which the longitudinal sectional shape has the two inclined surfaces 30a and 30b, the inclined surfaces 30a and 30b of the longitudinal sectional shape of the second prism 30 formed in the lens sheet 14 according to the present embodiment may be curved surfaces, or extremely, the sectional shape may be a circular arc shape.

Also, the second prism 30 may be formed such that the longitudinal sectional area thereof increases as the second prism 30 becomes closer from the peripheral portion 14c of the lens sheet 14 (see FIG. 1B) to the optical axis C of the light source 12. In order to realize this, for example, in the case where the longitudinal sectional shape of the second prism 30 is the triangular shape as illustrated in FIG. 2A, the apex angle 30r of the triangle may be formed to increase as the second prism 30 becomes closer to the optical axis C of the light source 12, or the height 30h of the triangle may be formed to increase as the second prism 30 becomes closer to the optical axis C of the light source 12.

The plurality of second prisms 30 is formed from the optical axis C of the light source 12 to the outer peripheral portion 14c of the lens sheet 14 on the surface 14a of the lens sheet 14 facing the light source 12 in the above-described surface. Also, similarly, the plurality of first prisms 15 is symmetrically formed around the optical axis C of the light source 12 on the surface 14a of the lens sheet 14 facing the light source 12. Therefore, the plurality of second prisms 30 intersects with the plurality of first prisms 15 at a plurality of locations, respectively. Specifically, as illustrated in FIG. 2B, the second prisms 30 intersect with the prisms 16 of the first lens group 14A (see FIG. 1A) or the prisms 18 of the second lens group 14B at a plurality of locations, wherein the prisms 16 and the prisms 18 constitute the first prism 15.

Therefore, in a molding die used when forming the lens sheet 14 by the injection molding method, grooves for forming the plurality of first prisms 15 and grooves for forming the plurality of second prisms 30 are provided to intersect with each other. When forming the lens sheet 14 using the molding die, for example, a molding material is injected into a cavity of the molding die of the lens sheet 14 from the location of the gate G illustrated in FIG. 1B, and the cavity is filled with the molding material. At this time, a plurality of grooves for forming the first prisms 15 is concentrically provided in a shape with an apex angle at a deep location, respectively. In this regard, air tends to easily remain in the vicinity of the apex angles of these grooves in such a manner that air is surrounded by the molding material and the molding die. However, a plurality of grooves for forming the first prisms 15 is provided in the molding die of the lens sheet 14. The plurality of grooves for forming the second prisms 30 intersects with the plurality of grooves for forming the first prisms 15, and reaches up to a location corresponding to the outer peripheral portion 14c of the lens sheet 14. For this reason, when injecting the molding material into the cavity of the molding die of the lens sheet 14, air existing in the cavity is discharged to the exterior of the molding die through the grooves for forming the second prisms 30 by the molding material, without remaining in the vicinity of the apex angles of the grooves for forming the respective prisms.

Also, in the example of FIG. 2B, the second prism 30 is formed such that the height thereof in the direction perpendicular to the lens sheet 14 is substantially equal to the height of the prism 18 constituting the first prism 15, but the lens sheet 14 according to the present embodiment is not limited thereto. In the lens sheet 14 according to the present embodiment, the height of the second prism 30 may be arbitrarily set. For example, as described above, in the molding die used when forming the lens sheet 14 by the injection molding method, the height may be set such that air existing in the cavity is efficiently discharged. Furthermore, the height may be set considering the deflection effect of the second prism 30, which is to be described below.

Next, FIG. 3 illustrates a half of the first lens group 14A disposed on one side of the optical axis C of the light source 12 in the illumination device 10 illustrated in FIGS. 1A and 1B, wherein the first lens group 14A constitutes the first prism 15 and is formed on the face 14a of the lens sheet 14 which faces the light source 12. Note that the second prism 30 formed to intersect with the first lens group 14A is not illustrated in the FIG. 3. As illustrated in a magnified manner, the first lens group 14A includes a plurality of prisms 16 each having an inclined surface 16a inclined toward the optical axis C of the light source 12. In the description herein, the lens group 14A includes the plurality of prisms 16 each having the inclined surface 16a inclined toward the optical axis C of the light source 12 will be referred to as a "concave Fresnel lens".

As illustrated in FIG. 3, the plurality of prisms 161, 162, 163 . . . included in the first lens group 14A is formed such that inclination angles $\theta_1, \theta_2, \theta_3$ . . . of the inclined surfaces 16a decrease according to the distance from the optical axis C of the light source 12 ($\theta_1 > \theta_2 > \theta_3$). Also, in the example of FIGS. 1 and 3, while considering a distance Y between the light emission surface 12a of the light source 12 and the surface 14a of the lens sheet 14 which faces the light source 12 (or an angle between the optical axis C and an imaginary line connecting the light emission surface 12a and the facing surface 14a), the inclination angles $\theta_1, \theta_2, \theta_3$ . . . of the inclined surfaces 16a of the respective prism 161, 162, 163 . . . are set such that an output angle of outgoing light from the light source 12, which is output through the first lens group 14A, is a constant value of 20° regardless of the distance from the optical axis C of the light source 12. The inclination angles $\theta_1, \theta_2, \theta_3$ of the inclined surfaces 16a of the respective prisms 161, 162, 163 . . . can be easily calculated from a known relational expression.

On the other hand, a plurality of reflection prisms (see FIG. 1A) is formed in the second lens group 14B constituting the first prism 15 of the lens sheet 14.

Herein, let us consider a case where the illumination device 10 is provided with the lens sheet 14 having the configuration illustrated in FIGS. 1A, 1B and 3. When the outgoing light L from the light source 12 is output from the lens sheet 14, the deflection of the optical path of the outgoing light L from the light source 12 by the plurality of prisms 16 of the first lens group 14A constituting the first prism 15 will be described with reference to FIGS. 4A to 4D in comparison with lens sheets having other configurations. Note that, in order to facilitate the understanding of the optical path deflection by the first lens group 14A, the deflection effect by the second prism 30 formed to intersect with the first lens group 14A is not illustrated in FIGS. 4A to 4D.

Figure 12:
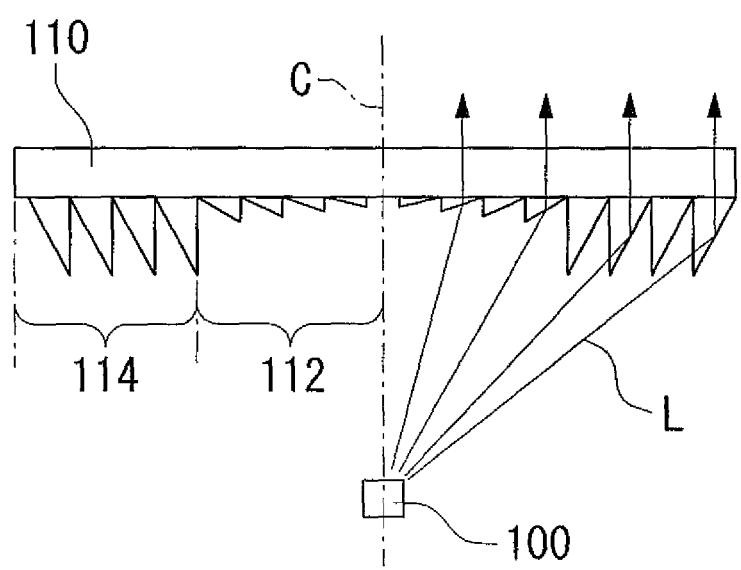
FIG. 12 is a cross-sectional view schematically illustrating a configuration of a conventional illumination device using a pseudo white LED as a light source.

FIG. 4A illustrates a case where the plurality of prisms 16 constituting the first lens group 14A of the lens sheet 14 is a concave Fresnel lens. In this case, when the outgoing light L from the light source 12 is output from the lens sheet 14, the optical path of the outgoing light L is deflected outward with respect to the optical axis C of the light source 12 by deflection on the inclined surface 16a of each prism 16 that is inclined toward the optical axis C of the light source 12. Therefore, color mixture is facilitated between the outgoing light L from the light source 12 that is output through the first lens group 14A of the lens sheet 14 and the outgoing light (see FIG. 12) that is output in parallel to the optical axis C of the light source 12 through the plurality of reflection prisms 18 of the second lens group 14B (see FIG. 1A) disposed on the outer side of the first lens group 14A.

Figure 4B:
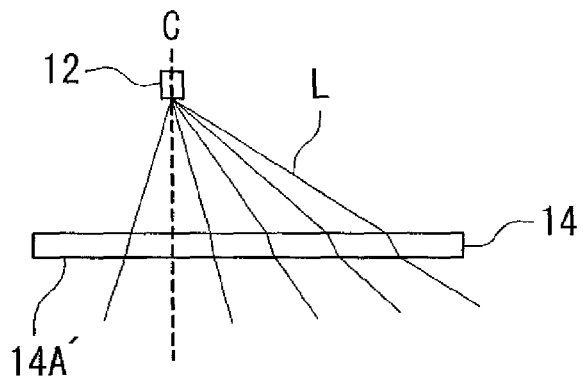

On the other hand, as illustrated in FIG. 4B, let us consider a case where the first lens group 14A' of the lens sheet 14 is not provided with prisms and is formed to have a flat surface. In this case, the optical path of the outgoing light L from the light source 12 is slightly changed by refraction occurring when the outgoing light L is input to the lens sheet 14 and is output from the lens sheet 14. However, the optical path of the input light is about the same angle as the optical path of the outgoing light. Therefore, color mixture with the outgoing light (see FIG. 12) that is output in parallel to the optical axis C of the light source 12 through the plurality of reflection prisms 18 of the second lens group 14B disposed on the outer side of the first lens group 14A cannot be expected up to a degree equal to that in the case of FIG. 4A according to the first embodiment of the present invention.

Figure 4C:
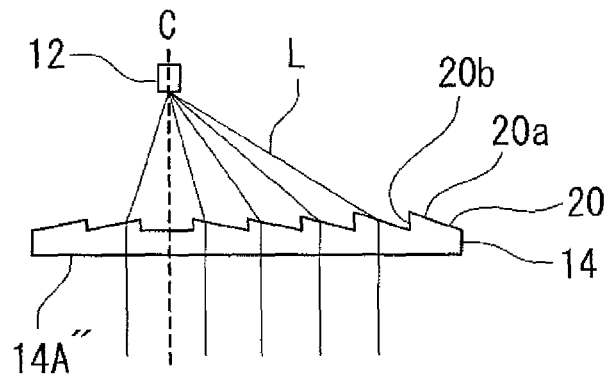

Also, as illustrated in FIG. 4C, let us consider a case where the first lens group 14A" of the lens sheet 14 is provided with a plurality of prisms 20 each having an inclined surface 20a inclined toward an opposite side to the optical axis C of the light source 12, and inclination angles of the inclined surfaces of the respective prisms 20 increase according to the distance from the optical axis C of the light source 12. In this description, the lens group including the plurality of prisms 20 each having the inclined surface 20a inclined toward the opposite side to the optical axis C of the light source 12 will be referred to as a "convex Fresnel lens".

In this case, although depending on the inclination angles, the optical path of the outgoing light L from the light source 12 when output from the lens sheet 14 is deflected in a direction parallel to the optical axis C of the light source 12 by refraction on the inclined surfaces 20a of the respective prisms 20 inclined toward the opposite side to the optical axis C of the light source 12. Also, even if the inclination angle of the inclined surface 20a of each prism 20 is increased, the output angle of the outgoing light L from the lens sheet 14 cannot be larger (in the outward direction with respect to the optical axis C of the light source 12) as compared with the case illustrated in FIG. 4B where the first lens group 14A' is not provided with prisms and is formed to have the flat surface. Therefore, color mixture is hardly expected between the outgoing light L from the light source 12 that is output through the first lens group 14A" of the lens sheet 14 and the outgoing light (see FIG. 12) that is output in parallel to the optical axis C of the light source 12 through the plurality of reflection prisms 18 of the second lens group 14B disposed on the outer side of the first lens group 14A.

Figure 4D:
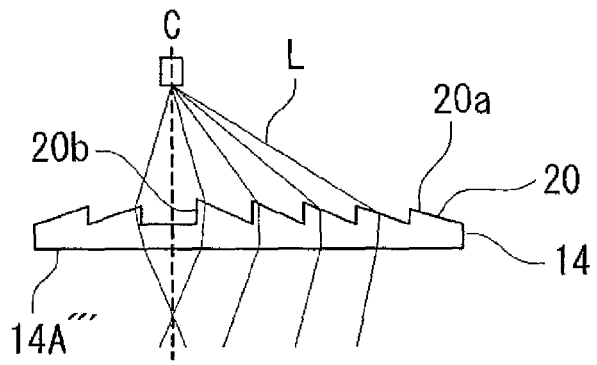

Furthermore, as illustrated in FIG. 4D, let us consider a case where the first lens group 14A''' of the lens sheet 14 is provided with a convex Fresnel lens and inclination angles of the inclined surfaces 20a of the respective prisms 20 decrease according to the distance from the optical axis C of the light source 12.

In this case, although depending on the inclination angles, the optical path of the outgoing light L from the light source 12 when output from the lens sheet 14 is certainly deflected inward with respect to the optical axis C of the light source 12 by refraction on the inclined surfaces 20a of the respective prisms 20 inclined toward the opposite side to the optical axis C of the light source 12.

However, when the inclination angle of the inclined surface 20a is increased in order to enhance the deflection effect, a height of each prism 20 becomes larger accordingly. As a result, a proportion of the outgoing light L from the light source 12 that is input to a surface 20b parallel to the optical axis C and facing toward the optical axis C of the light source 12 in the entire outgoing light L from the light source 12 is increased. The light input to the surface 20b parallel to the optical axis C and facing toward the optical axis C of the light source 12 is not directed forward when seen from the light emission surface 12a of the light source 12 (see FIG. 1A). That is, the light input to the surface 20b does not serve as effective light but becomes so-called stray light, which causes deterioration in light use efficiency.

Thus, in the example of FIG. 4D, luminance of illumination light of the illumination device 10 is deteriorated, although color mixture can be expected between the outgoing light L from the light source 12 that is output through the first lens group 14A''' of the lens sheet 14 and the outgoing light (see FIG. 12) that is output in parallel to the optical axis C of the light source 12 through the plurality of reflection prisms 18 of the second lens group 14B disposed on the outer side of the first lens group 14A.

Herein, a case where the deflection effect by the second prism 30 is added to the example illustrated in FIG. 4A will be described. As illustrated in FIGS. 1B, 2A and 2B, the second prism 30 is formed to have the inclined surfaces 30a and 30b in a longitudinal cross-sectional shape, from the optical axis C of the light source 12 to the outer peripheral portion 14c of the lens sheet 14. Therefore, as opposed to the outgoing light L that is input to the first prism 15, the optical path of the outgoing light L from the light source 12, which is input to the second prism 30, is deflected in a direction perpendicular to the inclined surface in FIG. 4A, and is output from the lens sheet 14. Therefore, color mixture is facilitated between the outgoing light L from the light source 12 that is output through the second prism 30 of the lens sheet 14 and the outgoing light that is output through the plurality of reflection prisms 16 being the concave Fresnel lenses of the first lens group 14A constituting the first prism 15 and is deflected outward with respect to the optical axis C of the light source 12. Moreover, color mixture is facilitated between the outgoing light L from the light source 12 that is output through the second prism 30 and the outgoing light (see FIG. 12) that is output in parallel to the optical axis C of the light source 12 through the plurality of reflection prisms 18 of the second lens group 14B (see FIG. 1A) disposed on the outer side of the first lens group 14A.

Figure 5:
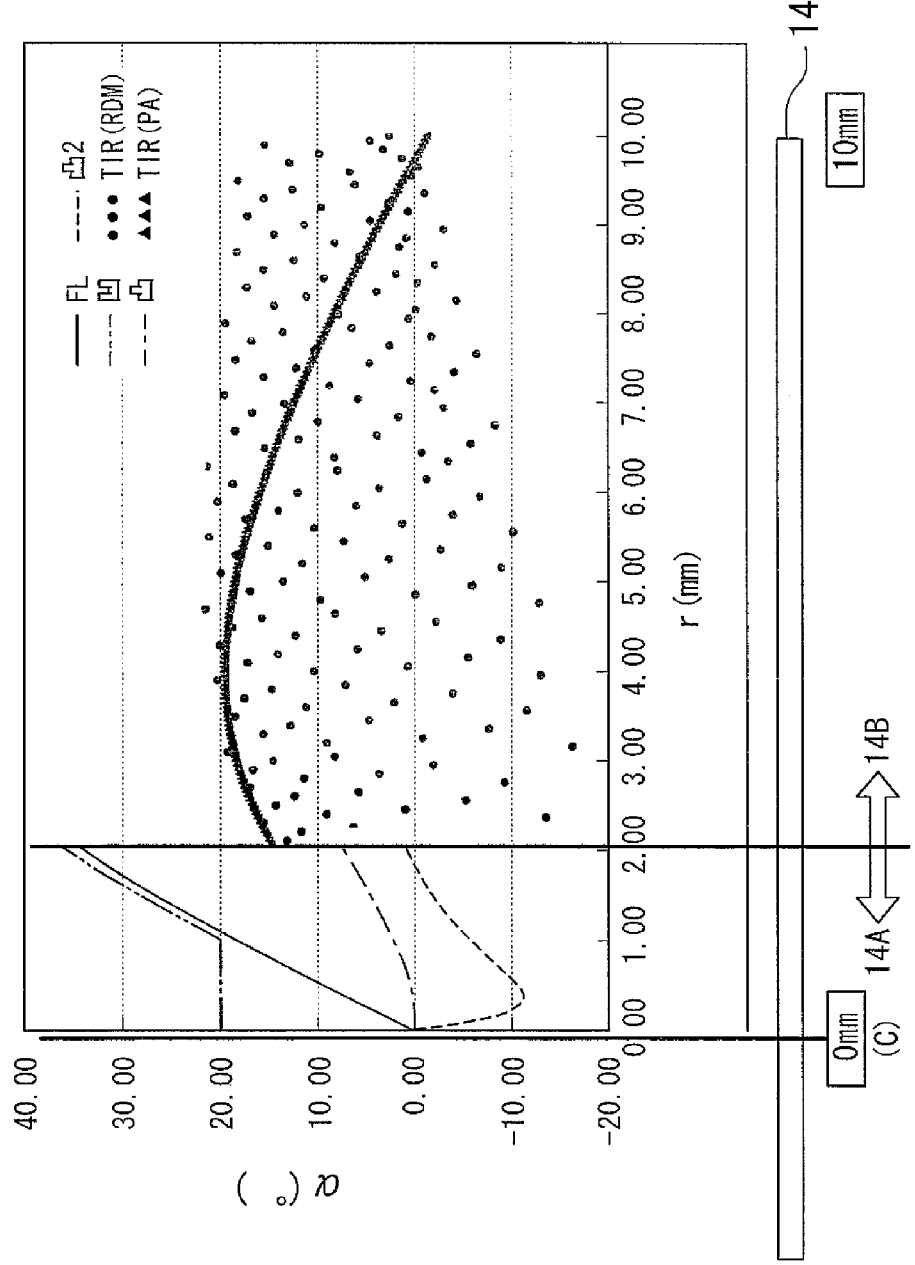
FIG. 5 illustrates a graph showing a relationship between an output angle of the outgoing light from a light source that is output through the lens sheet of the illumination device illustrated in FIGS. 1A and 1B, and a distance from the optical axis of the light source, together with a schematic view of the lens sheet.

Furthermore, FIGS. 5, 6A and 6B show characteristics of the illumination device 10 provided with the lens sheet 14 having the configuration illustrated in FIGS. 1A, 1B and 3 according to the first embodiment of the present invention. A horizontal axis represents a distance r (mm) of the first lens group 14A and the second lens group 14B from the lens center (the optical axis C of the light source 12), wherein the first lens group 14A and the second lens group 14B constitute the first prism 15. A vertical axis represents an output angle α(°) of the outgoing light from the lens sheet 14. In FIGS. 5, 6A and 6B, in order to facilitate the understanding of data of the optical path deflection by the first lens group 14A and the second lens group 14B, the deflection effect of the output angle by the second prism 30 is not reflected to the data.

Also, in FIGS. 5, 6A and 6B, the data according to the first embodiment of the present invention is indicated by a symbol "凹". Moreover, as reference examples regarding the first lens group 14A, data according to comparative example of FIG. 4B is indicated by a symbol "FL", data according to comparative example of FIG. 4C is indicated by a symbol " 凸 ", and data corresponding to comparative example of FIG. 4D is indicated by a symbol "凸 2". Furthermore, regarding the second lens group 14B, data according to the reflection prisms whose respective inclined surfaces are random in the inclination angle is indicated by a symbol "TIR (RDM)", and data according to the conventional reflection prisms whose respective inclined surfaces are constant in the inclination angle is indicated by a symbol "TIR (PA)".

Regarding the first lens group 14A constituting the first prism 15 of the lens sheet 14 according to the first embodiment of the present invention, a region with r equal to or less than 1 mm is formed as follows. That is, as in the examples illustrated in FIGS. 1A, 1B and 3, the distance Y between the light emission surface 12a of the light source 12 and the surface 14a of the lens sheet 14 which faces the light source 12 is taken into consideration, and the respective inclination angles θ1, θ2, θ3 . . . of the inclined surfaces 16a of the prisms 161, 162, 163 . . . are formed to decrease according to the distance from the optical axis C of the light source 12 such that the output angle of the outgoing light L from the light source 12 that is output through the first lens group 14A is a constant value of 20° regardless of the distance from the optical axis C of the light source 12. Therefore, it can be seen that the output angle α is a constant value of 20° in the region with r equal to or less than 1 mm. Meanwhile, in a region with r between 1 and 2 mm, the inclination angle of the inclined surface 16a of each prism 16 is set such that the output angle α increases continuously.

It can be seen that the output angle of 凹 according to the first embodiment of the present invention is larger than that in the case of each comparative example over the entire region with r equal to or less than 2 mm, in which the first lens group 14A is formed.

Moreover, it can be seen that in an entire region with r larger than 2 mm in, which the second lens group 14B constituting the first prism 15 is formed, the output angle α of 凹 according to the first embodiment of the present invention is randomly distributed regardless of the distance from the optical axis C of the light source 12. Therefore, the color mixture is further facilitated between the outgoing light from the light source 12 that is output through the first lens group 14A and the outgoing light from the light source 12 that is output through the second lens group 14B disposed on the outer side of the first lens group 14A.

Figure 7:
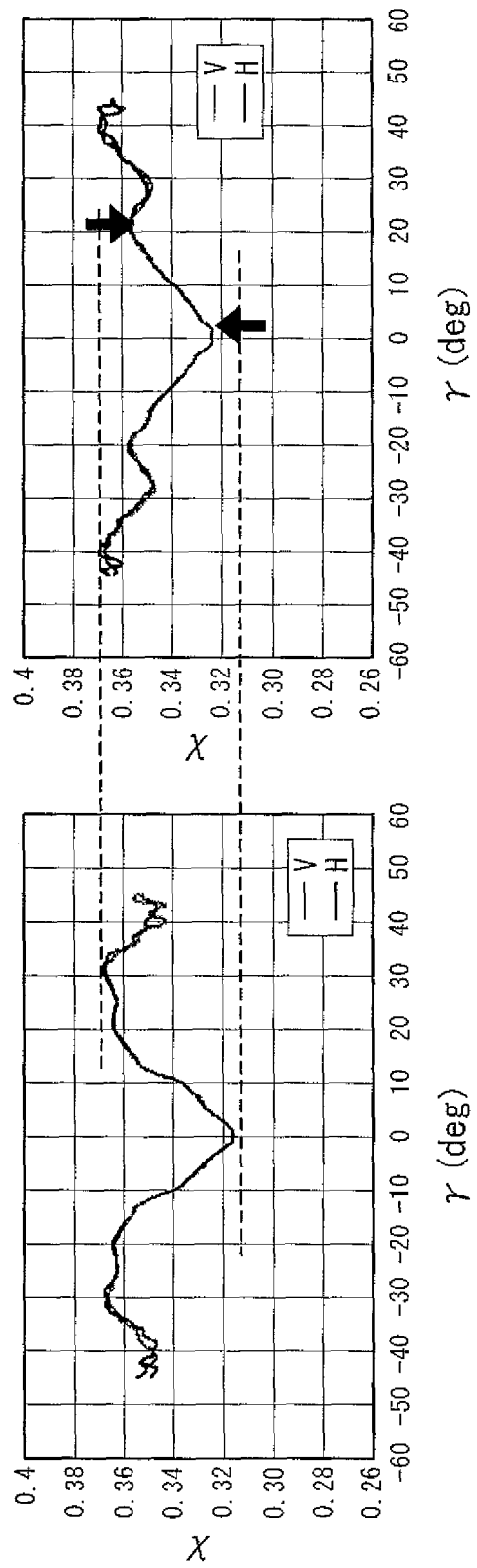
FIG. 7 is a graph illustrating comparison between a chromaticity distribution of illumination light of the illumination device illustrated in FIGS. 1A and 1B and a chromaticity distribution of illumination light of an illumination device according to a reference example.

FIG. 7 illustrates a relationship between a directivity angle γ (deg) and chromaticity X in the illumination device 10 with the lens sheet 14 having the configuration illustrated in FIGS. 1A, 1B and 3 according to the first embodiment of the present invention (graph on the right side), in comparison with the lens sheet having the configuration of comparative example of FIG. 4C. In FIG. 7, a symbol V represents a vertical direction and a symbol H represents a horizontal direction (a vertical direction and a horizontal direction of the pseudo white LED 100 whose light emission surface is rectangular). Note that, in FIG. 7, in order to facilitate the understanding of the effect of the optical path deflection by the first lens group 14A and the second lens group 14B constituting the first prism 15, the deflection effect of the output angle by the second prism 30 is not reflected to data.

As can be seen from the comparison, the illumination device 10 according to the first embodiment of the present invention has characteristics that the chromaticity of the center (on the optical axis C of the light source 12) is enhanced and the chromaticity near the directivity angle±20 (deg) is lowered, so that the variation ΔX of the chromaticity X from the center to the peak decreases from 0.53 to 0.34. This reduces color unevenness that has been inevitable when the pseudo white LED 100 (see FIG. 11) is used in the light source 12 of the illumination device 10.

Herein, let us consider a case where the deflection effect of the output angle by the second prism 30 is added to the data of the illumination device 10 with the lens sheet 14 having the configuration illustrated in FIGS. 1A, 1B and 3 according to the first embodiment of the present invention, which is illustrated in FIG. 7. As described above, the outgoing light whose optical path is deflected through the second prism 30 facilitates the color mixture with the outgoing light that is output through the first lens group 14A and the second lens group 14B constituting the first prism 15. Therefore, it is expected that the variation ΔX of the chromaticity X from the center (on the optical axis C of the light source 12) to the peak will be further reduced than the result illustrated in the graph on the right side of FIG. 7. This further reduces color unevenness that has been inevitable when the pseudo white LED 100 (see FIG. 11) is used in the light source 12 of the illumination device 10.

The configuration according to the first embodiment of the present invention can obtain the following functional effects. That is, as illustrated in FIG. 1A, the illumination device 10 according to the first embodiment of the present invention has the light source 12 (100) including the plurality of light emitting elements (blue LEDs 102) disposed adjacent to one another; and the phosphors (yellow phosphors 108) receiving light emitted by the light emitting elements and emitting the wavelength-converted light, and the lens sheet 14 is disposed on the optical axis C of the light source 12. In the example of FIG. 1A, the lens sheet 14 includes the plurality of first prisms 15 disposed concentrically around the optical axis C of the light source 12 on the surface 14a facing the light source 12. Furthermore, as illustrated in FIG. 1B, the plurality of second prisms 30 reaching up to the outer peripheral portion 14c of the lens sheet 14 is radially formed around the optical axis C of the light source 12 on the surface where the first prisms 15 of the lens sheet 14 are formed, that is, on the surface 14a facing the light source 12. Therefore, as illustrated in FIG. 2B, each first prism 15 (in the example of FIG. 2B, the prism 18 of the second lens group 14B constituting the first prism 15) and each second prism 30 intersect with each other at the plurality of locations on the surface 14a of the lens sheet 14 that faces the light source 12.

Herein, a case where the lens sheet 14 of the illumination device 10 according to the first embodiment of the present invention is formed by the injection molding method will be described with reference to FIGS. 1A, 1B, 2A and 2B. The lens sheet 14 is formed by injecting the molding material into the molding die of the lens sheet 14 from the location corresponding to the outer peripheral portion 14c of the lens sheet 14 through the gate (symbol G of FIG. 1B) of the injection molding machine, and filling the cavity of the molding die with the molding material. The plurality of grooves for forming the first prisms 15 is concentrically provided in the molding die of the lens sheet 14. Moreover, the plurality of grooves for forming the second prisms 30 is provided to intersect with the plurality of grooves for forming the first prisms 15 at the plurality of locations and reach up to the region corresponding to the outer peripheral portion 14c of the lens sheet 14. Therefore, when filling the cavity of the molding die with the molding material, air existing in the cavity is efficiently discharged to the exterior of the molding die from the region corresponding to the outer peripheral portion 14c of the lens sheet 14 of the molding die through the grooves for forming the second prisms 30, which intersect with the grooves for forming the first prisms 15, without remaining in the vicinity of the apex angles of the grooves for forming the first prisms 15 (at which air tends to easily remain). Therefore, in the illumination device 10 according to the first embodiment of the present invention, when the lens sheet 14 is formed by the injection molding method, the shape of the lens sheet 14 is not deformed by the air remaining in the cavity of the molding die, and the lens sheet 14 can have a desired shape with excellent moldability.

Also, in the illumination device 10 according to the first embodiment of the present invention, the outgoing light L from the light source 12 (see FIG. 3) is input to the lens sheet 14 disposed on the optical axis C of the light source 12. The optical path of the light input to the lens sheet 14 is deflected by the plurality of first prisms 15 disposed concentrically around the optical axis C of the light source 12 on the surface 14a of the lens sheet 14 that faces the light source 12. Then, the light whose optical path is deflected by the plurality of first prisms 15 is output. Furthermore, the plurality of second prisms 30 reaching up to the outer peripheral portion 14c of the lens sheet 14 is radially formed around the optical axis C of the light source 12 on the surface 14a of the lens sheet 14 that faces the light source 12. Thus, the light output through the second prisms 30 receives a deflection effect different from that of the light output through the first prisms 15 and is output from the lens sheet 14. In this manner, the use of the lens sheet 14 with excellent moldability facilitates the color mixture of the outgoing light from the light source 12 that is output through the lens sheet 14. Therefore, the use of the lens sheet 14 having a desired shape can reduce color unevenness that has been inevitable when the pseudo white LED 100 (see FIG. 11) is used in the light source 12 of the illumination device 10.

Moreover, in the illumination device 10 according to the first embodiment of the present invention, the plurality of second prisms 30 having the configuration described above is formed on the lens sheet 14. Thus, the strength of the lens sheet 14 can be enhanced as compared with a case where the second prisms 30 are not formed. As a result, the impact resistance of the illumination device 10 is enhanced, and the damage of the illumination device 10 is prevented when the device is dropped down. Also, due to the enhancement in the strength of the lens sheet 14, the lens sheet 14 can be made further thin. Therefore, the enhancement in the light output from the lens sheet 14, the reduction in the weight of the illumination device 10, and the reduction in the cost of materials can be achieved.

Also, in the illumination device 10 according to the first embodiment of the present invention, each of the plurality of second prisms 30, which is formed on the surface 14a of the lens sheet 14 that faces the light source 12, has the inclined surfaces 30a and 30b that are inclined with respect to the surface 14b of the lens sheet 14 opposite to the light source 12. In this manner, the outgoing light L from the light source 12 that is input to the second prism 30 of the lens sheet 14 more effectively receives the deflection effect on the inclined surfaces 30a and 30b of the second prism 30 and is output from the lens sheet 14. Also, in the lens sheet 14 of the illumination device 10 according to the present embodiment, the inclined surfaces 30a and 30b of the second prism 30 may be curved surfaces, and the longitudinal sectional shape of the second prism 30 may be a circular arc shape. In this case, the outgoing light L from the light source 12 that is input to the second prism 30 also more effectively receives the deflection effect on the curved surfaces of the second prism 30 and is output from the lens sheet 14. Therefore, the color mixture with the outgoing light output through the first prism 15 of the lens sheet 14 can be further facilitated.

Also, as illustrated in FIG. 1B, in the illumination device 10 according to the first embodiment of the present invention, the plurality of second prisms 30 formed to reach up to the outer peripheral portion 14c of the lens sheet 14 is radially disposed around the optical axis C of the light source 12 on the lens sheet 14, and the plurality of second prisms 30 is all formed to intersect with one another near the optical axis C of the light source 12. That is, all of the second prisms 30 are formed from the optical axis C of the light source 12 to the outer peripheral portion 14c of the lens sheet 14. In this manner, the outgoing light L from the light source 12 that is input to the lens sheet 14 also receives the deflection effect of the second prism 30 near the optical axis C of the light source 12. Thus, the outgoing light, whose optical path is deflected, is output. Moreover, all of the second prisms 30 are formed to intersect with one another near the optical axis C of the light source 12. As a result, the outgoing light L from the light source 12 that is input to the lens sheet 14 near the optical axis C of the light source 12 is deflected in different directions at each second prism 30 and is output from the lens sheet 14. Therefore, in the vicinity of the optical axis C of the light source 12 at which color unevenness easily occurs, the color mixture of the outgoing light output through different second prisms 30 of the lens sheet 14 can be facilitated. Furthermore, the color mixture with the outgoing light output through the first prisms 15 can be facilitated.

Moreover, in the illumination device 10 according to the first embodiment of the present invention, the plurality of second prisms 30 provided radially around the optical axis C of the light source 12 in the lens sheet 14 may be formed such that the longitudinal sectional area thereof increases as each of the second prisms 30 becomes closer to the optical axis C of the light source 12. In this manner, as the second prism 30 becomes closer to the optical axis C of the light source 12, the deflection effect by the second prism 30 can be increased. That is, since the deflection effect of the second prism 30 with respect to the outgoing light L from the light source 12 is controlled as appropriate according to the distance from the vicinity of the optical axis C of the light source 12 at which color unevenness easily occurs, the color mixture between the outgoing light output through the second prism 30 and the outgoing light output through the first prism 15 can be facilitated as appropriate.

Also, as illustrated in FIG. 1A, in the illumination device 10 according to the first embodiment of the present invention, the plurality of first prisms 15 formed on the surface 14a of the lens sheet 14 that faces the light source 12 includes the first lens group 14A and the second lens group 14B, wherein when the optical axis C of the light source 12 is considered as the reference location, the first lens group 14A is disposed on the inner side and the second lens group 14B is disposed on the outer side of the first lens group 14A. The first lens group 14A includes the plurality of prisms 16 each having the inclined surface 16a (see FIG. 3) that is inclined toward the optical axis C of the light source 12. Therefore, as illustrated in FIGS. 3 and 4A, when the outgoing light L from the light source 12 is output from the lens sheet 14, the optical path of the outgoing light L is deflected outward with respect to the optical axis C of the light source 12 by the plurality of prisms 16 which are included in the first lens group 14A constituting the first prism and each of which has the inclined surface 16a inclined toward the optical axis C of the light source 12. When controlling the deflection direction of the outgoing light L, the increase in the height of the prism 16 in order to change the inclination angle θn of the inclined surface 16a according to the distance from the optical axis C of the light source 12 results in the increase in the area of the surface 16b of the prism 16 (see FIG. 3) parallel to the optical axis. However, since the inclined surface 16a of the first lens group 14A is inclined toward the optical axis C of the light source 12, the outgoing light L from the light source 12 is not directly input to the surface 16b of the prism 16 parallel to the optical axis C, and deterioration in light use efficiency is not caused. Also, the color mixture is facilitated between the outgoing light from the light source 12 that is output through the first lens group 14A of the lens sheet 14 and the outgoing light from the light source 12 that is output through the second lens group 14B disposed on the outer side of the first lens group 14A. Furthermore, the color mixture with the outgoing light from the light source 12 that is output through the second prism 30 is also facilitated. As a result, it is possible to reduce color unevenness that has been inevitable when the pseudo white LED 100 (see FIG. 11) is used in the light source 12 of the illumination device 10.

Furthermore, as illustrated in FIG. 3, in the illumination device 10 according to the first embodiment of the present invention, the plurality of prisms 161, 162, 163 . . . included in the first lens group 14A constituting the first prism 15 is configured such that the angles θ1, θ2, θ3 . . . of the inclined surfaces 16a decrease according to the distance from the optical axis C of the light source 12 (θ1>θ2>θ3). Thus, the control of the deflection direction according to the distance from the optical axis C of the light source 12 is performed by the plurality of prisms 16 included in the first lens group. Also, the inclination angle of the inclined surface 16a of each prism decreases according to the distance from the optical axis C of the light source 12, such that the output angle of the outgoing light L from the light source 12, which is output through the first lens group 14A of the lens sheet 14, becomes constant regardless of the distance from the optical axis C of the light source 12. Thus, the color mixture can be controlled between the outgoing light from the light source 12 that is output through the second lens group 14B disposed on the outer side of the first lens group 14A and the outgoing light from the light source 12 that is output through the second prism 30.

Next, an illumination device 10' according to a second embodiment of the present invention will be described with reference to FIGS. 8A to 10B. In FIGS. 8A to 10B, the same reference numerals are assigned to the same or equivalent portions as those of the illumination device 10 according to the first embodiment of the present invention. Note that only differences between the illumination device 10' according to the second embodiment of the present invention and the illumination device 10 according to the first embodiment of the present invention will be described below, and redundant descriptions of the same configurations, actions and effects as those of the illumination device 10 according to the first embodiment of the present invention will not be included.

As illustrated in FIG. 8A, a lens sheet 14' of the illumination device 10' according to the second embodiment of the present invention includes a first prism 15 and a second prism 30 (see FIG. 1B) formed on a surface 14a facing the light source 12, which are similar to those formed on the surface 14a facing the light source 12 in the lens sheet 14 of the illumination device 10 according to the first embodiment of the present invention. Furthermore, as s illustrated in FIG. 8B in a magnified manner, a plurality of light scattering elements 22 is formed on a surface 14b opposite to the surface 14a facing the light source 12 in the lens sheet 14' according to the second embodiment of the present invention. The plurality of light scattering elements 22 is formed in a circular region whose center is at the optical axis C of the light source 12. It is preferable that a diameter of the circular region is set considering a diameter D of the lens sheet 14'. For example, when the diameter D of the lens sheet 14' is set to 20 mm, the diameter of the circular region where the light scattering elements 22 are formed is set to about 20 mm, which is equal to the diameter D of the lens sheet 14'. That is, the light scattering elements 22 are formed on the entire surface 14b opposite to the surface 14a of the lens sheet 14' that faces the light source 12. When the diameter D of the lens sheet 14' is set to 65 mm, the diameter of the circular region where the light scattering elements 22 are formed is set to about 15 mm. Alternatively, when the diameter D of the lens sheet 14' is set to 100 mm, the diameter of the circular region where the light scattering elements 22 are formed is set to about 20 mm. As illustrated in FIG. 8B in a magnified manner, dome-shaped light scattering elements are employed as the light scattering elements 22 according to the present embodiment. In the example of FIGS. 8A and 8B, a dome diameter of the dome-shaped light scattering element 22 is set to about 0.07 mm, and a density of the dome-shaped light scattering elements 22 with respect to the circular region where the dome-shaped light scattering elements 22 are formed is set to about 80%.

Next, the scattering operation of the plurality of light scattering elements 22 formed on the lens sheet 14' will be described with reference to FIG. 9. Note that the illustration of the second prism 30 is not included in FIG. 9. In the example of FIG. 9, the circular region is provided on the surface 14b opposite to the surface 14a of the lens sheet 14' that faces the light source 12, the center of the circular region is at the optical axis C of the light source 12, and the light scattering elements 22 are formed in the circular region. The diameter of the circular region is set to a value substantially equal to the diameter of the region where the prism 161 is formed. Therefore, in the outgoing light L from the light source 12, a portion of light passing through the prism 161 of the first lens group 14A constituting the first prism on the surface 14a of the lens sheet 14' that faces the light source 12 and also passing through the circular region where the light scattering elements 22 (see FIG. 8B) are formed on the surface 14b opposite to the surface 14a of the lens sheet 14' that faces the light source 12 is scattered into various angles and is output. On the other hand, in the outgoing light L from the light source 12, a portion of light passing through the first lens group 14A on the surface 14a of the lens sheet 14' that faces the light source 12 and also not passing through the circular region where the light scattering elements 22 are formed on the surface 14b opposite to the surface 14a of the lens sheet 14' that faces the light source 12 is output at an output angle of 20°. Therefore, it can be seen that the color mixture is more facilitated as compared with a case where the light scattering elements 22 are not formed on the surface 14b opposite to the surface 14a of the lens sheet 14' that faces the light source 12.

Furthermore, since the second prism 30 (see FIG. 1B) is formed on the lens sheet 14' of the illumination device 10' according to the second embodiment of the present invention, the deflection effect by the second prism 30 is added to the deflection effect by the first prism 15 and the scattering effect by the light scattering elements 22 with respect to the outgoing light L from the light source 12 that is input to the lens sheet 14'. Thus, it can be seen that the color mixture of the outgoing light from the lens sheet 14' is further facilitated.

Figure 10A:
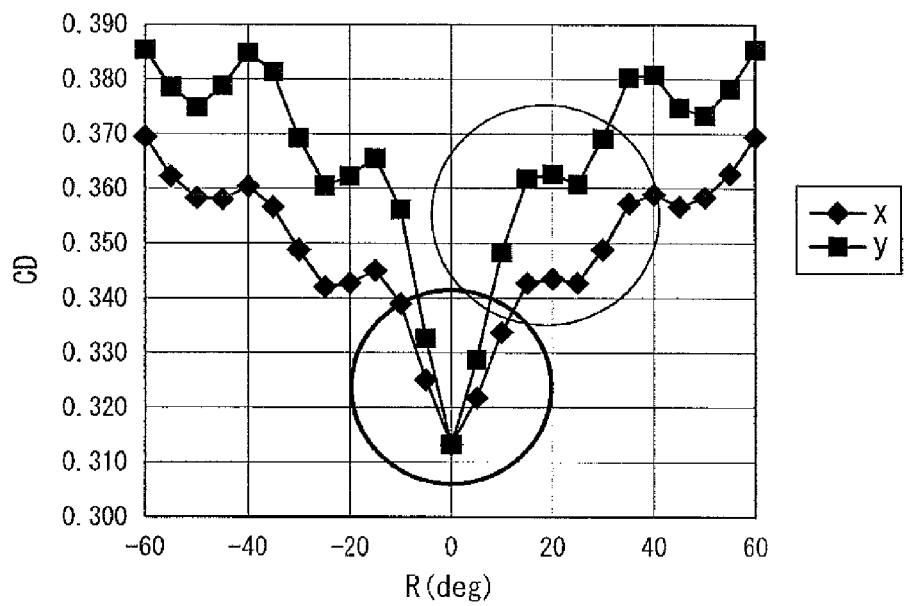
FIG. 10A is a graph illustrating a chromaticity distribution of illumination light of the illumination device according to a reference example.
Figure 10B:
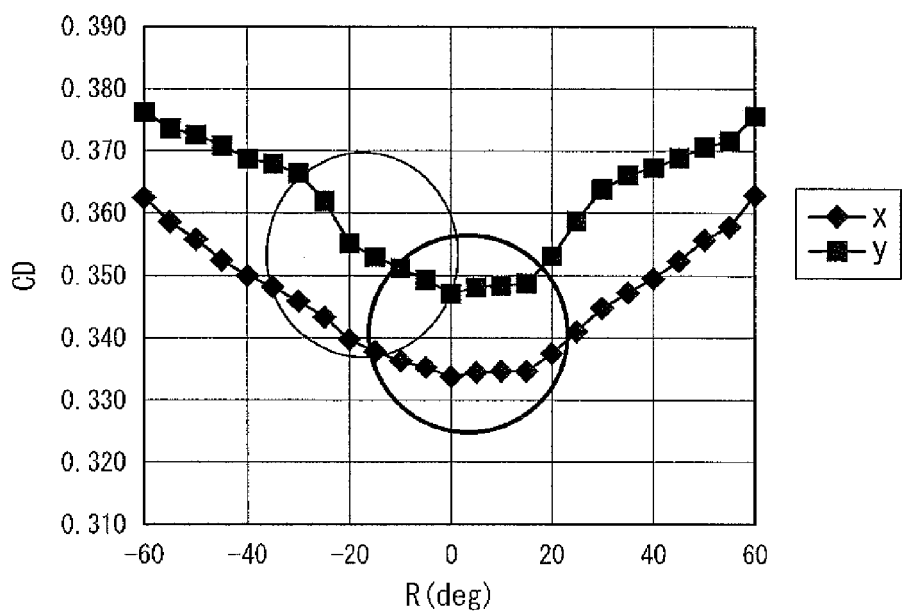
FIG. 10B is a graph illustrating a chromaticity distribution of illumination light of the illumination device illustrated in FIGS. 8A and 8B.

FIGS. 10A and 10B are graphs showing a comparison of measured chromaticity distribution of illumination light between two illumination devices different in configuration. FIG. 10A shows a measurement result regarding an illumination device in which no light scattering elements 22 are formed on the lens sheet 14' having the configuration illustrated in FIGS. 8A and 8B. FIG. 10B shows a measurement result regarding the illumination device 10' in which the lens sheet 14' as illustrated in FIGS. 8A, 8B and 9 is used Note that the deflection effect by the second prism 30 is not reflected to the measurement results of FIGS. 10A and 10B. In FIGS. 10A and 10B, a horizontal axis represents a directivity angle R (deg), a vertical axis represents chromaticity CD, a symbol x indicates the x value of chromaticity, and a symbol y indicates the y value of chromaticity. A distance from each illumination device to a measurement device is 1 m. As can be clearly seen from the comparison, the illumination device 10' according to the second embodiment of the present invention has characteristics that each chromaticity value (x, y) near the directivity angle R=0 deg (indicated by a thick line circle in each graph) is larger and each chromaticity value (x, y) near the directivity angle R=20 deg (indicated by a thin line circle in each graph) is smaller as compared with the case where no light scattering elements 22 are formed on the lens sheet 14'. That is, blue chromaticity is decreased near the directivity angle R=0 deg and yellow chromaticity is decreased near the directivity angle R=20 deg. This reduces color unevenness that has been inevitable when the pseudo white LED 100 (see FIG. 11) is used in the light source 12 of the illumination device 10'.

Also, let us consider a case where the measurement of the illumination device 10' with the lens sheet 14' while adding the deflection effect by the second prism 30 is performed under the same measurement method and conditions as those used when the measurement was performed in FIGS. 10A and 10B (disclosure of specific data is not included herein). In this case, the color mixture of the light output from the lens sheet 14' is further facilitated by the second prism 30. Thus, it is expected to obtain the measurement result that color unevenness inevitable when the pseudo white LED 100 is used in the light source 12 of the illumination device 10' is further reduced as compared with the measurement result illustrated in FIG. 10B.

As described above, in the illumination device 10' according to the second embodiment of the present invention, as illustrated in FIGS. 8A and 8B, the plurality of light scattering elements 22 is formed on the surface 14b opposite to the surface 14a of the lens sheet 14' that faces the light source 12. Therefore, as illustrated in FIG. 9, the outgoing light L from the light source 12 that is input to the lens sheet 14' receives the deflection effect by the prism 16 or the second prism 30 constituting the plurality of first prisms 15, which is formed on the surface 14a of the lens sheet 14 that faces the light source 12, and the optical path of the outgoing light L is deflected. Moreover, the light whose optical path is deflected travels within the lens sheet 14' and is then scattered into various angles by the plurality of light scattering elements 22 provided on the surface 14b opposite to the surface 14a of the lens sheet 14' that faces the light source 12. Thus, directional characteristic of the light is deteriorated and the light is output from the lens sheet 14'. Therefore, the color mixture of the outgoing light L from the light source 12 that is output through the lens sheet 14' is facilitated. As a result, color unevenness that has been inevitable when the pseudo white LED 100 (see FIG. 11) is used in the light source 12 of the illumination device 10' is further reduced as compared with the illumination device 10 according to the first embodiment of the present invention.

What is claimed is:

1. An illumination device comprising:
   a light source including a plurality of light emission elements disposed adjacent to one another and phosphors; and
   a lens sheet disposed on an optical axis of the light source where the lens sheet includes a plurality of first prisms disposed concentrically around the optical axis of the light source,
   wherein a plurality of second prisms is provided starting from the optical axis of the light source reaching up to an outer peripheral portion of the lens sheet, the plurality of second prisms radially crossing a surface of the lens sheet where the first prisms are formed.

2. The illumination device according to claim 1, wherein the second prisms each have an inclined surface that is inclined with respect to a surface of an opposite side of the lens sheet.

3. The illumination device according to claim 1, wherein all of the second prisms each intersect near the optical axis of the light source.

4. The illumination device according to claim 1, wherein each of the second prisms is formed such that a cross-sectional area of the second prism increases as moving closer to the optical axis of the light source.

5. The illumination device according to claim 1, wherein the plurality of first prisms includes a first lens group disposed on an inner side and a second lens group disposed on an outer side of the first lens group when setting the optical axis of the light source to be a reference location, and
   the first lens group includes a plurality of prisms each having an inclined surface that is inclined toward the optical axis of the light source.

6. The illumination device according to claim 5, wherein the plurality of prisms included in the first lens group is formed such that an inclination angle of the inclined surface decreases according to a distance from the optical axis of the light source.

7. The illumination device according to claim 1, wherein the plurality of first prisms and the plurality of second prisms are formed on a surface of the lens sheet that faces the light source, and
   a plurality of light scattering elements is formed on a surface opposite to the surface of the lens sheet that faces the light source.

* * * * *